US012663948B2

(12) United States Patent     (10) Patent No.:   US 12,663,948 B2

Kanamoto     (45) Date of Patent:   *Jun. 23, 2026

(54) IMAGE FORMING APPARATUS CONFIGURED TO COMMUNICATE THROUGH DIFFERENT WIRELESS MODES

(71) Applicant: CANON KABUSHIKI KAISHA, Tokyo (JP)

(72) Inventor: Yoshiji Kanamoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/815,019

(22) Filed: Aug. 26, 2024

(65) Prior Publication Data

US 2024/0419376 A1     Dec. 19, 2024

Related U.S. Application Data

(63) Continuation of application No. 18/353,632, filed on Jul. 17, 2023, now Pat. No. 12,099,762.

(30) Foreign Application Priority Data

Jul. 22, 2022    (JP) ................................. 2022-117401

(51) Int. Cl.
   *G06F 3/12*        (2006.01)
   *H04W 84/12*      (2009.01)

(52) U.S. Cl.
   CPC .......... *G06F 3/1236* (2013.01); *G06F 3/1204* (2013.01); *G06F 3/1286* (2013.01); *G06F 3/1292* (2013.01); *G06F 3/1229* (2013.01); *H04W 84/12* (2013.01)

(58) Field of Classification Search
CPC .... G06F 3/1236; G06F 3/1204; G06F 3/1286; G06F 3/1292; G06F 3/1229
See application file for complete search history.

(56) References Cited

FOREIGN PATENT DOCUMENTS

| JP | 2014072767 A | 4/2014 |
|---|---|---|
| JP | 2020108123 A | 7/2020 |
| WO | 2018128007 A1 | 7/2018 |

OTHER PUBLICATIONS

Matt Hanson, et al., Best wireless printers of 2022, TechRadar, web, Feb. 2022, https://web.archive.org/web/20220223115043/https://www.techradar.com/news/bestwireless-printers.

*Primary Examiner* — Nicholas Pachol

(74) *Attorney, Agent, or Firm* — Canon U.S.A., Inc. IP Division

(57) ABSTRACT

An image forming apparatus receives a first trigger frame including information about OFDMA conforming to the IEEE 802.11 standard from an external access point external to the image forming apparatus while a first mode is enabled, performs communication processing in the first mode through OFDMA conforming to the IEEE 802.11 standard based on information about the first trigger frame, and transmits, in a case where the a mode is enabled, a second trigger frame including information about OFDMA conforming to IEEE 802.11 standard.

18 Claims, 12 Drawing Sheets

FIG.2A

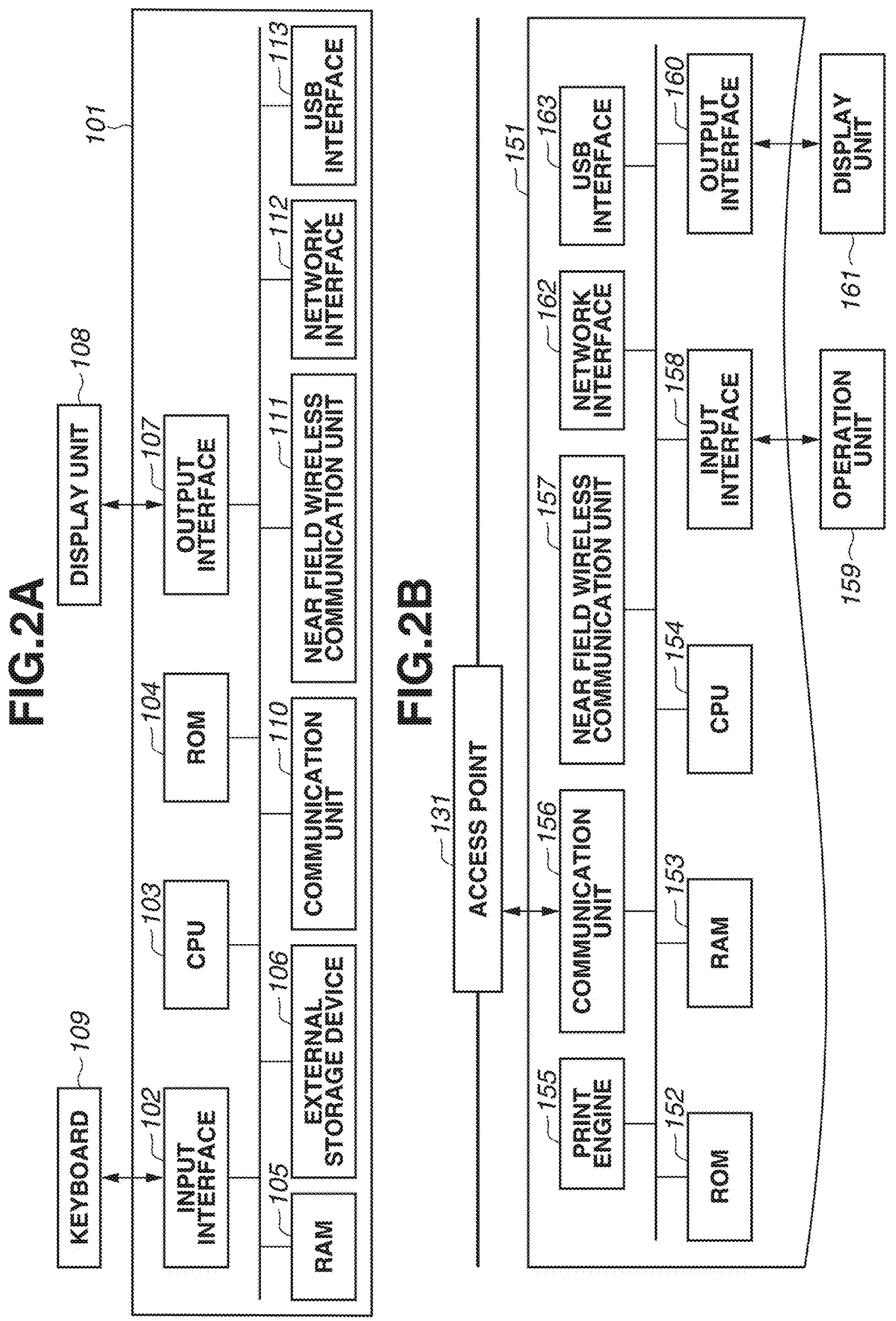

KEYBOARD — 109

INPUT INTERFACE — 102

RAM — 105

CPU — 103

EXTERNAL STORAGE DEVICE — 106

ROM — 104

COMMUNICATION UNIT — 110

DISPLAY UNIT — 108

OUTPUT INTERFACE — 107

NEAR FIELD WIRELESS COMMUNICATION UNIT — 111

NETWORK INTERFACE — 112

USB INTERFACE — 113

ACCESS POINT — 131

COMMUNICATION UNIT — 156

PRINT ENGINE — 155

ROM — 152

RAM — 153

CPU — 154

NEAR FIELD WIRELESS COMMUNICATION UNIT — 157

INPUT INTERFACE — 158

NETWORK INTERFACE — 162

USB INTERFACE — 163

OPERATION UNIT — 159

OUTPUT INTERFACE — 160

DISPLAY UNIT — 161

Figure 3:
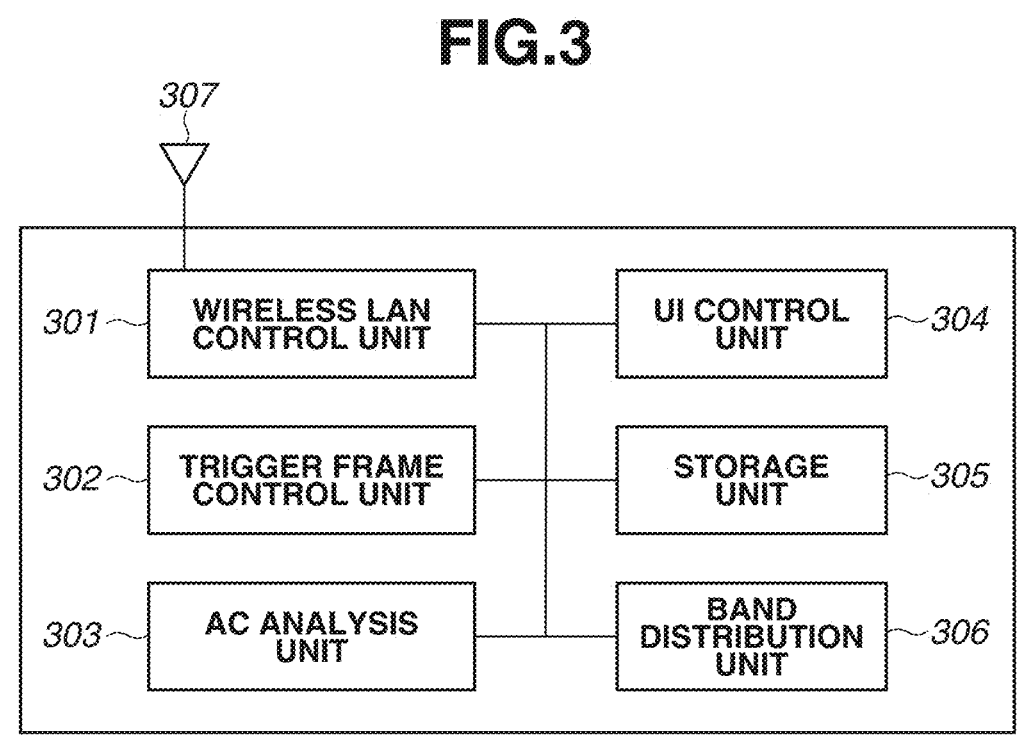

301~ | WIRELESS LAN CONTROL UNIT |

304~ | UI CONTROL UNIT |

302~ | TRIGGER FRAME CONTROL UNIT |

305~ | STORAGE UNIT |

303~ | AC ANALYSIS UNIT |

306~ | BAND DISTRIBUTION UNIT |

FIG.6

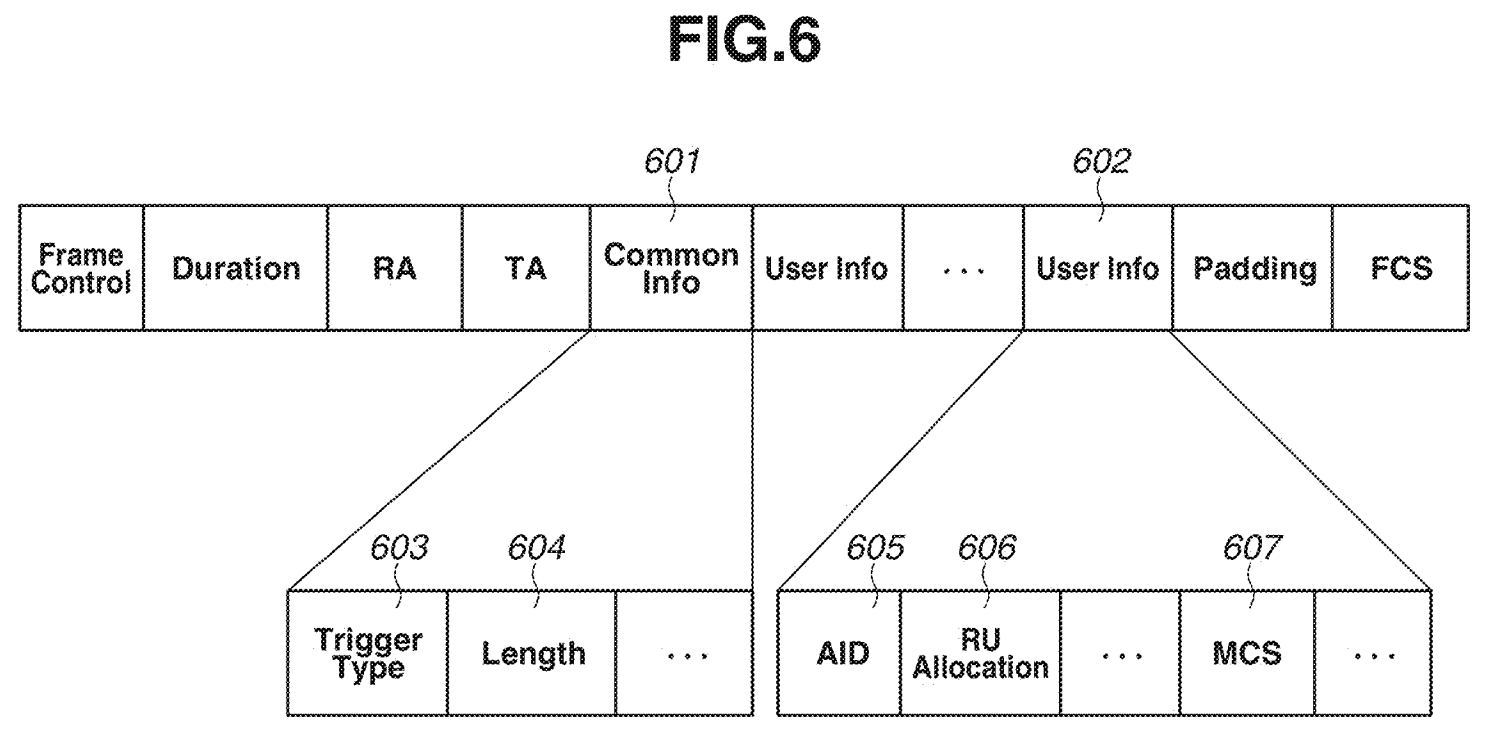

| Frame Control | Duration | RA | TA | Common Info | User Info | ... | User Info | Padding | FCS |
|---|---|---|---|---|---|---|---|---|---|

601 — Common Info

| Trigger Type | Length | ... |
|---|---|---|

603    604

602 — User Info

| AID | RU Allocation | ... | MCS | ... |
|---|---|---|---|---|

605    606                607

*900*

*900*

IMAGE FORMING APPARATUS CONFIGURED TO COMMUNICATE THROUGH DIFFERENT WIRELESS MODES

CROSS REFERENCE OF RELATED APPLICATIONS

This application is a continuation application of U.S. patent application Ser. No. 18/353,632, filed on Jul. 17, 2023, which claims the benefit of Japanese Patent Application No. 2022-117401, filed Jul. 22, 2022, each of which is hereby incorporated by reference herein in its entirety.

BACKGROUND

Field

The present disclosure relates to an image forming apparatus.

Description of the Related Art

Japanese Patent Application Laid-Open No. 2012-19487 discloses a technique for enabling an image forming apparatus to concurrently perform wireless communication in an infrastructure mode and wireless communication in an ad hoc mode via an access point.

In recent years, wireless communication has been used in various ways, and there has been a demand for the provision of highly convenient wireless communication.

SUMMARY

According to an embodiment of the present disclosure, an image forming apparatus includes a first setting unit configured to enable a first mode for performing a wireless communication via an external access point external to the image forming apparatus, a second setting unit configured to enable a second mode for performing a wireless communication without interposing an external access point external to the image forming apparatus, a reception unit configured to receive a first trigger frame including information about OFDMA conforming to the IEEE 802.11 standard from an external access point external to the image forming apparatus while the first mode is enabled, a communication unit configured to perform communication processing in the first mode through OFDMA conforming to the IEEE 802.11 standard based on information about the first trigger frame, a transmission unit configured to transmit, in a case where the second mode is enabled, a second trigger frame including information about OFDMA conforming to IEEE 802.11 standard, and a print processing unit configured to perform print processing on a sheet based on a print job received through a wireless communication in the first mode or a wireless communication in the second mode.

Further features of the present disclosure will become apparent from the following description of exemplary embodiments with reference to the attached drawings.

BRIEF DESCRIPTION OF THE DRAWINGS

FIG. 2A illustrates an example of a hardware configuration of a portable terminal, and FIG. 2B illustrates an example of a hardware configuration of an image forming apparatus.

FIG. 3 illustrates an example of a functional configuration of an access point.

FIG. 6 illustrates another example of a frame configuration.

DESCRIPTION OF THE EMBODIMENTS

Exemplary embodiments of the present disclosure will be described in detail below with reference to the accompanying drawings. The present exemplary embodiment of the present disclosure is to be considered to be illustrative. Note that, unless otherwise described, constituent elements, processing steps, display screens, and other specific examples are not intended to limit the scope of the present invention thereto.

(System Configuration)

Figure 1:
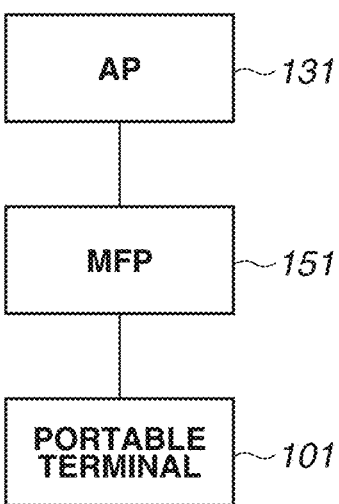
FIG. 1 illustrates an example of a system configuration according to the present exemplary embodiment.

FIG. 1 illustrates an example of a configuration of a system according to the present exemplary embodiment. The present system is an example of a wireless communication system in which a plurality of communication apparatuses is capable of wirelessly communicating with each other. In the example in FIG. 1, the system includes an access point 131, a multi function peripheral (MFP) 151, and a portable terminal 101. Examples of the portable terminal 101 include a notebook computer and a smart phone.

The MFP 151 has a print function, a read function (scanner), and a facsimile function. The MFP 151 according to the present exemplary embodiment has a communication function of wirelessly communicating with the portable terminal 101. While the present exemplary embodiment will be described using an example of case where the MFP 151 is used, the present invention is not limited thereto. For example, a facsimile apparatus, scanner, projector, and single function printing apparatus may be used instead of the MFP 151. According to the present exemplary embodiment, an apparatus having a print function may be referred to as an image forming apparatus.

The access point 131 is provided separately from (or outside) the portable terminal 101 and the MFP 151, and operates as a base station apparatus of a wireless local area network (WLAN). The access point 131 may be described as an external access point 131 or an external wireless base station (or an external parent station). The MFP 151 having a WLAN communication function can perform communication in the WLAN infrastructure mode via the access point 131. Hereinafter the access point 131 may be referred to as an "AP". The infrastructure mode may be referred to as a "wireless infrastructure mode" or "infrastructure mode".

The infrastructure mode is a mode in which the MFP 151 communicates with other apparatuses via an external apparatus (e.g., the AP 131) forming a network. A connection with the external AP 131 established by the MFP 151 operating in the infrastructure mode is referred to as an infrastructure connection. According to the present exemplary embodiment, the MFP 151 operates as a child station and the external AP 131 operates as a parent station in the infrastructure connection. In the present exemplary embodiment, the parent station refers to an apparatus that forms a network and determines the communication channel to be used in the network. A child station refers to an apparatus that does not determine the communication channel to be used in the network to which the child station belongs but performs wireless communication via the communication channel determined by the parent station.

The AP 131 wirelessly communicates with the (authenticated) communication apparatus permitted to connect to the AP 131, and relays wireless communication between the relevant communication apparatus and other communication apparatuses. For example, the AP 131 is connected to a wired communication network, and relays communication between a communication apparatus connected to the wired communication network and other communication apparatuses wirelessly connecting to the AP 131.

The portable terminal 101 and the MFP 151 can perform wireless communication in the wireless infrastructure mode via the external AP 131 or in the peer-to-peer mode without interposing the external AP 131, by using the WLAN communication function of each apparatus. Hereinafter, peer-to-peer is referred to as "P2P".

A communication without interposing the external AP 131 may be referred to as direct wireless communication. The P2P mode includes Wi-Fi Direct® and a software AP mode. Hereinafter, Wi-Fi Direct® may be referred to as WFD. The P2P mode can also be referred to as communication conforming to the IEEE 802.11 series.

In the P2P mode, the MFP 151 directly communicates with other apparatuses, such as the portable terminal 101, without interposing an external apparatus forming a network. According to the present exemplary embodiment, the P2P mode includes the AP mode in which the MFP 151 operates as an AP. Connection information (service set identifier (SSID) and/or password) for the AP to be enabled in the MFP 151 in the AP mode is freely settable by the user. The P2P mode may include, for example, a WFD mode in which the MFP 151 performs Wi-Fi Direct (WFD) communication. Which one of a plurality of WFD-compatible apparatuses operates as a parent station is determined based on a sequence called Group Owner Negotiation. The parent station may be determined without execution of Group Owner Negotiation. In particular, a WFD-compatible apparatus that serves as a parent station is referred to as a group owner. A direct connection to other apparatuses that is established by the MFP 151 operating in the P2P mode is referred to as a direct connection. According to the present exemplary embodiment, in the direct connection, the MFP 151 operates as a parent station, and other apparatuses (including the portable terminal 101) operate as child stations.

The configurations of the portable terminal 101 according to the present exemplary embodiment and a communication apparatus capable of communicating with the portable terminal 101 according to the present exemplary embodiment will be described below with reference to FIGS. 2A and 2B. While the present exemplary embodiment will be described below using the following example configuration, the present exemplary embodiment is applicable to an apparatus capable of communicating with a communication apparatus, and the functions are not particularly limited to FIGS. 2A and 2B.

The portable terminal 101 includes an input interface 102, a central processing unit (CPU) 103, a read only memory (ROM) 104, a random access memory (RAM) 105, an external storage device 106, an output interface 107, a display unit 108, a keyboard 109, a communication unit 110, a near field wireless communication unit 111, a network interface 112, and a universal serial bus (USB) interface 113. The computer of the portable terminal 101 includes the CPU 103, the ROM 104, and the RAM 105.

The input interface 102 receives input data and operating instructions from the user through operations on an operation unit, such as the keyboard 109. The operation unit may include a physical keyboard and physical buttons, or a software keyboard and software buttons displayed on the display unit 108. More specifically, the input interface 102 may receive inputs (operations) from the user via the display unit 108.

The CPU 103 serves as a system control unit that controls overall operations of the portable terminal 101. The ROM 104 stores control programs to be executed by the CPU 103, and fixed data, such as data tables and programs of a built-in operating system (hereinafter referred to as an OS). According to the present exemplary embodiment, the control programs stored in the ROM 104 perform scheduling, task switching, interrupt processing, and other software execution control under the control of the built-in OS stored in the ROM 104.

The RAM 105 includes a static random access memory (SRAM) for which a backup power source is to be used. The data in the RAM 105 is retained with a primary battery for data backup (not illustrated), so that important data, such as program control variables, can be stored in the RAM 105 without volatilization. A memory area for storing setting information for the portable terminal 101 and management data of the portable terminal 101 is also provided in the RAM 105. The RAM 105 is also used as the main memory and work memory of the CPU 103.

The external storage device 106 stores, for example, a print information generation program for generating print information that is interpretable by a printing apparatus 115. The output interface 107 controls the display unit 108 to display data and notify the user of the status of the portable terminal 101.

The display unit 108 including a light emitting diode (LED) display or liquid crystal display (LCD) displays data and notifies the user of the status of the portable terminal 101. The communication unit 110 connects to the MFP 151, the access point (AP) 131, and/or the like to perform data communication. For example, the communication unit 110 is connectable to an AP (not illustrated) in the MFP 151. When the communication unit 110 connects to an AP in the MFP 151, a P2P communication is enabled between the portable terminal 101 and the MFP 151. The communication unit 110 may directly communicate with the MFP 151 via wireless communication, or communicate with the MFP 151 via an external apparatus, such as the AP 131, present external to the portable terminal 101 and the MFP 151. External apparatuses include an external AP (such as the AP 131) present external to the portable terminal 101 and the MFP 151, and an apparatus capable of relaying communication other than the AP 131. According to the present exemplary embodiment, the wireless communication method used by the communication unit 110 is, for example, but not limited to, Wireless Fidelity (Wi-Fi)_(registered trademark), a communication standard conforming to the IEEE 802.11 series. Examples of the AP 131 include a wireless LAN router.

The near field wireless communication unit 111 is a component for wirelessly connecting to an apparatus, such as the MFP 151, within a short range and performing data communication based on a communication method different from that used by the communication unit 110.

The near field wireless communication unit 111 is connectable to, for example, a near field wireless communication unit 157 in the MFP 151. Examples of applicable communication methods include Near Field Communication (NFC), Bluetooth® Classic, Bluetooth® Low Energy, and Wi-Fi Aware.

The network interface 112 is a connection interface (I/F) for controlling wireless communication processing and communication processing via a wired LAN cable.

The USB interface 113 is a connection I/F for controlling a USB connection via a USB cable. More specifically, the USB interface 113 is used for connection to the MFP 151 and the external AP 131 via a USB connection to perform data communication.

The MFP 151 will be described below. The MFP 151 includes a ROM 152, a RAM 153, a CPU 154, a print engine 155, a communication unit 156, the near field wireless communication unit 157, an input interface 158, an operation unit 159, an output interface 160, a display unit 161, a network interface 162, and a USB interface 163. The computer of the MFP 151 is formed of the ROM 152, the RAM 153, and the CPU 154.

The communication unit 156 controls communication processing using the above-described interfaces. For example, the MFP 151 is operable in the infrastructure and the Peer to Peer (P2P) modes, in which communication is performed using the communication unit 156.

More specifically, the communication unit 156 is operable as an AP in the MFP 151. For example, the MFP 151 operates as an AP when the user instructs the MFP 151 to enable the AP therein. According to the present exemplary embodiment, the wireless communication method used by the communication unit 156 is a communication standard conforming to the IEEE 802.11 series. In the following descriptions, wireless fidelity (Wi-Fi)®, i.e., Wi-Fi communication, is a communication standard conforming to the IEEE 802.11 series. The communication unit 156 may include a hardware component that functions as an AP. Alternatively, the communication unit 156 may operate as an AP (software AP mode) by using software for causing the communication unit 156 to function as an AP. When the communication unit 156 operates as a parent station, the communication unit 156 is enabled to maintain, in parallel, a P2P wireless connection with up to the predetermined number of apparatuses serving as a child station (e.g., up to three apparatuses). The communication unit 156 can perform wireless communication by using a frequency band selected from 2.4, 5 and 6 GHz bands.

The near field wireless communication unit 157 is configured to wirelessly connect to apparatuses, such as the portable terminal 101, within a short range. For example, the near field wireless communication unit 157 is connectable to the near field wireless communication unit 111 in the portable terminal 101. Examples of applicable communication methods include NFC, Bluetooth® Classic, Bluetooth® Low Energy, and Wi-Fi Aware.

The RAM 153 includes a SRAM to which a backup power source is to be supplied. The data in the RAM 153 is retained by a primary battery for data backup (not illustrated), which enables storing of important data, such as program control variables, in the RAM 153 without volatilization. A memory area for storing setting information for the MFP 151 and management data of the MFP 151 is also provided in the RAM 153. The RAM 153 is also used as the main memory and work memory of the CPU 154. The RAM 153 includes a receive buffer for temporarily storing print information received from the portable terminal 101 and stores various information.

The ROM 152 stores control programs to be executed by the CPU 154 and fixed data, such as data tables and OS programs. According to the present exemplary embodiment, the control programs stored in the ROM 152 perform scheduling, task switching, interrupt processing, and other software execution control under the control of the built-in OS stored in the ROM 152.

The CPU 154 serves as a system control unit that controls overall operations of the MFP 151.

The print engine 155 performs print processing for applying a recording agent, such as ink, onto a recording medium, such as a sheet, to form an image on the recording medium, based on the information stored in the RAM 153 and/or a print job received from the portable terminal 101, and outputs a print result. In general, a print job transmitted from the portable terminal 101 has a large amount of data, the use of a high-speed communication method is demanded for print job communication. Thus, the MFP 151 receives a print job via the communication unit 156 capable of higher speed communication than the near field wireless communication unit 157. Ink-based printing is to be considered to be illustrative, and printing may be performed by using a toner-based electrophotographic method. For ink-based printing, the MFP 151 may be of the cartridge type in which an ink cartridge is attached or of a type in which ink is replenished from an ink bottle to an ink tank. The MFP 151 performs print processing on a sheet based on a print job received through wireless communication via the infrastructure mode or wireless communication via the P2P mode.

The MFP 151 may be attached with a memory such as an external hard disk drive (HDD) and/or a secure digital (SD) card as an optional device, and information to be stored in the MFP 151 may be stored in this memory.

The input interface 158 receives input data and operating instructions from the user through operations on the operation unit 159, which is, for example, physical buttons. The operation unit 159 may include a software keyboard and software buttons displayed on the display unit 161.

More specifically, the input interface 158 may receive inputs from the user via the display unit 161.

The output interface 160 controls the display unit 161 to display data and notify the user of the status of the MFP 151.

The display unit 161 includes a light emitting diode (LED) display or liquid crystal display (LCD), and displays data and notifies the user of the status of the MFP 151.

The USB interface 163 controls a USB connection via a USB cable. More specifically, the USB interface 163 is used for connection to the MFP 151 and an apparatus, such as the external AP 131, via a USB connection to perform data communication.

FIG. 3 is a block diagram illustrating an example of a functional configuration of the AP 131. The AP 131 includes, for example, a wireless LAN control unit 301, a trigger frame control unit 302, a reception frame analysis unit 303, a user interface (UI) control unit 304, a storage unit 305, and a band distribution unit 306 as FUNCTIONAL components.

The wireless LAN control unit 301 performs control to transmit and receive wireless communication signals to/from other wireless LAN communication apparatuses. For example, the wireless LAN control unit 301 can be implemented by a program for controlling a baseband circuit, a radio frequency (RF) circuit, and an antenna for a wireless LAN. The wireless LAN control unit 301 performs wireless LAN communication control conforming to the IEEE 802.11 standard series, and performs wireless communication with a STA (equivalent to a child station) conforming to the IEEE 802.11 standard series.

The trigger frame control unit 302 performs control to transmit a trigger frame to a successfully authenticated STA via the wireless LAN control unit 301. In response to receiving the trigger frame, the STA transmits an uplink (UL) frame as a response to the trigger frame. In response to receiving the UL frame via the wireless LAN control unit 301, the AP 131 interprets the specification of the received UL frame using the reception frame analysis unit 303. For example, when the received UL frame includes information about an access category (AC), the reception frame analysis unit 303 acquires the information about the AC through analysis and grasps which AC's transmission target data is held by the STA that is the transmission source of the UL frame.

The band distribution unit 306 determines the range of the frequency band to be allocated for data transmission of each STA, the center frequency of the frequency band, and the time when the frequency band is allocated, based on the information acquired by the reception frame analysis unit 303. More specifically, the band distribution unit 306 determines the frequency range in which a wireless resource is to be allocated to each STA, and the timing of the allocation. The trigger frame control unit 302 notifies each STA of the information about the band distribution determined by the band distribution unit 306 via the trigger frame, and instructs each STA to transmit a UL frame in accordance with the band distribution.

The UI control unit 304 is implemented by a program for controlling the hardware related to user interfaces of the AP 131 (not illustrated), such as a touch panel and buttons, for receiving user operations on the AP 131. The UI control unit 304 also has a function of presenting information, such as image display and audio output to the user. The storage unit 305 includes a RAM and ROM for storing programs and data for operations of the AP 131.

Figure 7:
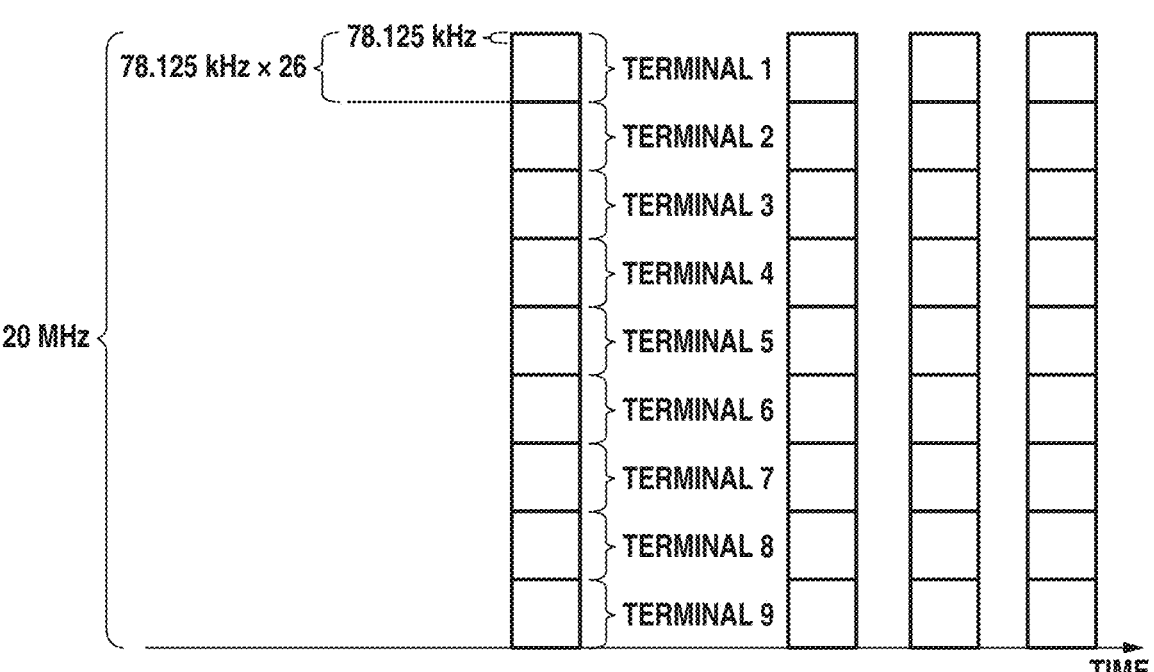
FIG. 7 illustrates an example of a sub channel configuration.

FIG. 7 illustrates a configuration of a sub carrier. In IEEE 801.11ax, allocation of the frequency band with a size smaller than 20 MHz to STAs is enabled, so that a number of STAs can use wireless resources at the same time. Such allocation of wireless resources is performed by using orthogonal frequency division multiple access (OFDMA). In IEEE802.11ax, for example, the 20 MHz bandwidth is divided into nine blocks having 26 sub carriers (tones) that do not overlap with each other on the frequency axis, and wireless resources are allocated to the portable terminal 101 on a block basis. This allocation block unit is referred to as a resource unit (RU). The size of a RU is determined in accordance with the number of terminals for which frequency bandwidths and wireless resources are allocated. The RU size is represented by the number of tones as unit. Examples of the usable number of tones include 26, 52, 106, 242, 484, 996, and 2×996. In the 20 MHz bandwidth, an RU size of up to 242 tones is useable. In a case where all the 20 MHz bandwidth is allocated to one terminal, up to 242 tones is allocatable.

In contrast, in a case where, for example, nine different terminals use the 20 MHz bandwidth at the same time, 26 tones are allocated to each terminal. Dividing the frequency band with the minimum allocation unit (26 tones) in this way enables nine terminals to perform communication by using the 20 MHz bandwidth at the same time. Similarly, in a case where the 40, 80, and 160 MHz frequency bands are used, up to 18, 37, and 74 terminals perform communication, respectively, at the same time.

Figure 4:
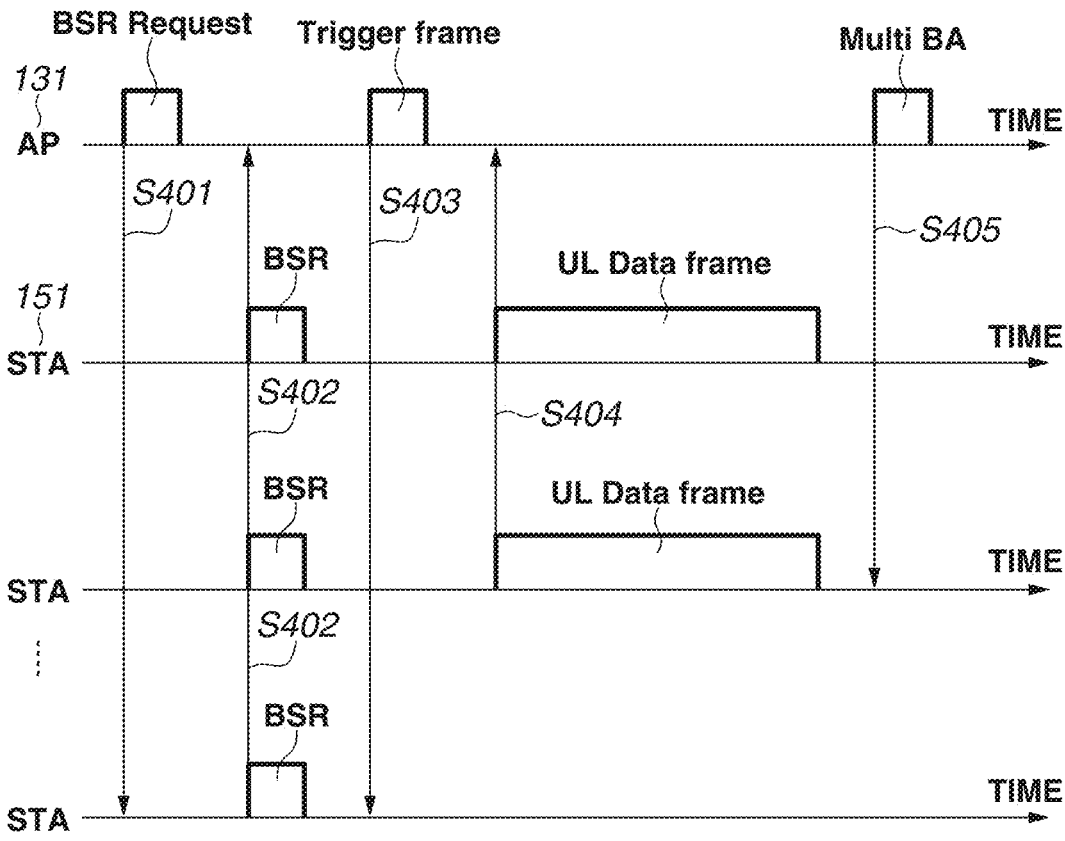
FIG. 4 illustrates an example of communication processing according to the present exemplary embodiment.

Basic processing of multi user (MU) communication in UL will be described below with reference to FIG. 4. In step S401, the AP 131 transmits a buffer status report request (BSR Request) to each STA via the trigger frame control unit 302. According to the present exemplary embodiment, the AP 131, the MFP 151, and the portable terminal 101 are capable of performing communication conforming to IEEE 801.11ax. According to the present exemplary embodiment, the portable terminal 101 does not belong to a network established by the AP 131.

Figure 5:
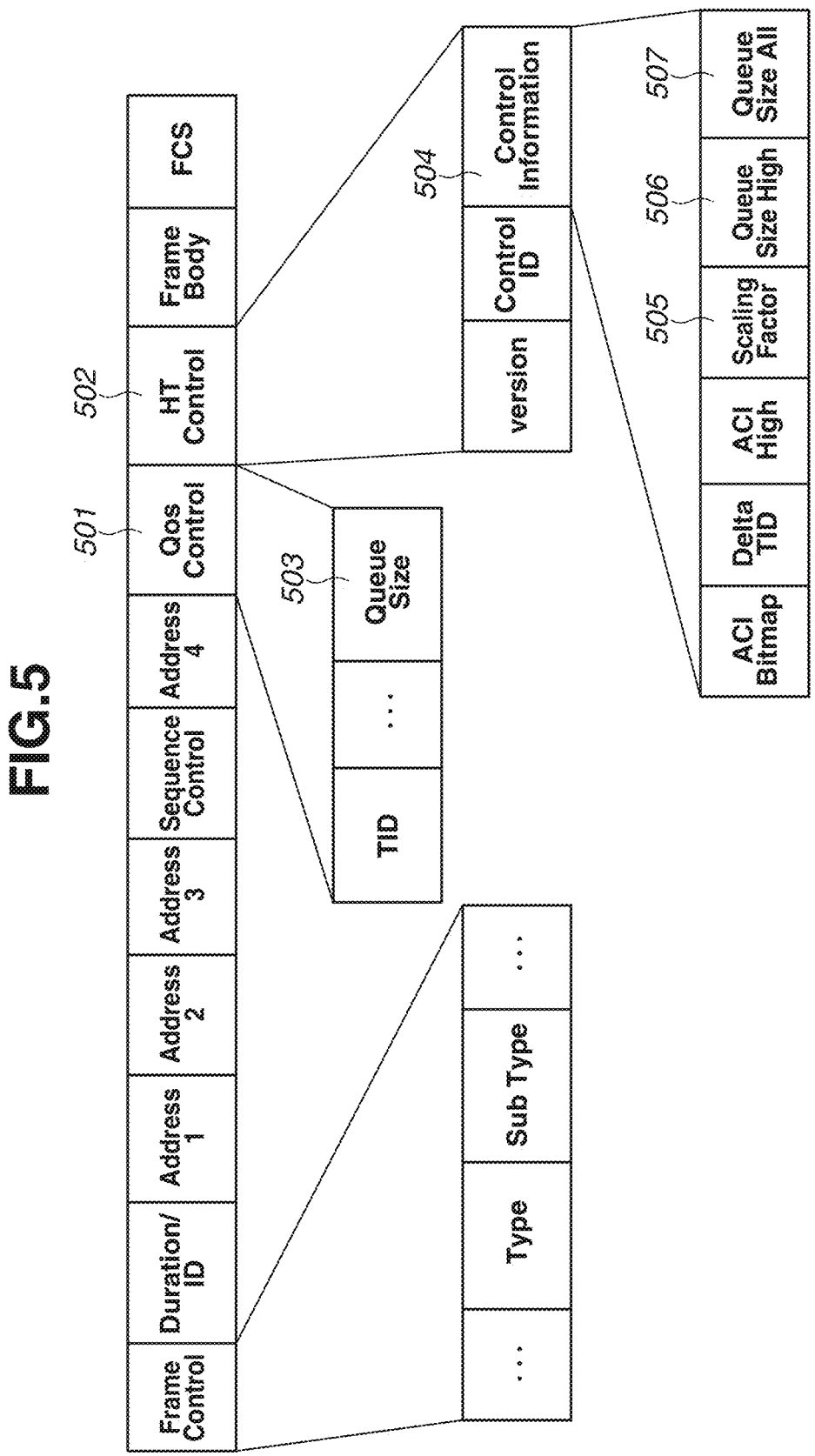
FIG. 5 illustrates an example of a frame configuration.

Referring back to FIG. 4, in step S402, each STA transmits a buffer status report (BSR). The BSR is used when each STA notifies the AP 131 of the amount of its transmission buffer. An example configuration of a BSR frame will be illustrated in FIG. 5. The amount of transmission buffer of each STA is indicated by a queue size sub field 503 included in a QoS control field 501. Alternatively, the amount of transmission buffer of each STA can be indicated by a scaling factor sub field 505, a queue size high sub field 506, and a queue size all sub field 507 in a control information sub field 504 in an HT control field 502.

In response to receiving of a BSR frame from each STA, then in step S403, the AP 131 transmits a trigger frame for promoting a UL data transmission based on the information to each STA. In this case, the AP 131 determines the RU allocation in UL-OFDMA and the communication time common to all STAs, based on the information about the amount of transmission buffer included in the BSR frame. Subsequently, the AP 131 transmits a trigger frame including the information about the RU and the information about the data communication time common to all STAs (hereinafter this information is referred to as RU/communication time information). More specifically, the AP 131 transmits a trigger frame including information regarding OFDMA. FIG. 6 illustrates a configuration of a trigger frame.

A common info field 601 includes information common to all STAs. The data communication time common to all STAs is set in a length sub field 604 in the common info field 601. When a trigger type sub field 603 is 0, a user info field 602 is added. The common info field 601 also includes other information. For example, the common info field 601 includes Carrier Sense (CS) Required, and stores information indicating whether the carrier sense execution is required. In a case where the common info field 601 includes information indicating that the carrier sense execution is required, the STAs that has received the trigger frame perform the carrier sense. On the other hand, in a case where the common info field 601 includes information indicating that the carrier sense execution is not required, the STAs that has received the trigger frame do not perform the carrier sense. An STA is specified by an AID sub field 605 in the user info field 602. The RU (a unit grouping a plurality of sub carriers) and the tone size to be allocated to the STA are specified by the index value indicated by an RU allocation sub field 606. The tone size refers to a value indicating the range of the frequency band that is allocatable to each STA. Modulation and coding scheme (MCS) is specified to an MCS sub field 607.

The AP reserves a communication channel for transmitting a trigger frame. The AP then divides the reserved communication channel into a plurality of resource units and allocates each resource unit to the portable terminal 101.

When each STA receives the trigger frame including information regarding, then in step S404, each STA transmits a data frame of the UL within the range of the data amount determined by a length sub field 604 in the trigger frame. In this case, when the trigger frame includes information indicating that the carrier sense execution is required, each STA performs the carrier sense and then performs the operation in step S404. For example, the MFP 151 may transmit scan data in step S404. In addition, the MFP 151 may also transmit information regarding consumables (including at least one of the remaining ink amount, the remaining amount of toner, and the remaining amount of sheets) in step S404. Alternatively, the MFP 151 may transmit information indicating the status of the MFP 151 (including the occurrence of a paper jam error and the cover being open).

In response to the AP 131 receiving PPDU from each STA, then in step S405, the AP 131 transmits a Multi Block Ack (Multi BA) as a reception confirmation. Operations of the MFP 151 will be described below with reference to FIG. 8. Here, it is assumed that, in the MFP 151, both the infrastructure communication and the P2P communication modes are enabled by a user instruction. Both modes are enabled when, for example, the user enables the infrastructure mode and then enables the WFD mode by using the operation panel of the MFP 151. In P2P communication, the MFP 151 is operating as a parent station (e.g., a group owner of WFD). In P2P communication, a P2P communication other than the WFD mode, for example, a software AP mode, may be performed.

In this case, the MFP 151 is assumed to have received the trigger frame from the AP 131 in step S403. In a case where both the infrastructure communication and the P2P communication modes are enabled, the MFP 151 may refer to the communication channel to be used in infrastructure communication and serve as a parent station to establish a network to perform P2P communication by using the same communication channel. In a case where both the infrastructure communication and the P2P communication modes are enabled, the MFP 151 refers to the communication channel to be used in infrastructure communication. Then, the MFP 151 may serve as a parent station and establish a network to perform P2P communication by using a communication channel different from the communication channel used in infrastructure communication. More specifically, referring to FIG. 8, the MFP 151 receives the trigger frame from the external access point 131 in step S403 while both the infrastructure communication and the P2P communication modes are enabled.

In step S801, the MFP 151 itself is operating as a parent station, and thus, the MFP 151 transmits a trigger frame. The MFP 151 divides one communication channel (e.g., 20 MHz) into a plurality of resource units by using the trigger frame as described above in conjunction with FIG. 5, and allocates each resource unit to the STAs including the portable terminal 101. More specifically, the RU allocation sub field 606 in the trigger frame transmitted by the MFP 151 includes information about the allocation of the resource units. The maximum number of child station apparatuses for which a resource unit is to be allocated by the MFP 151 is the number for which direct connections are maintainable in parallel. For example, when the communication unit 156 is maintainable P2P wireless connections with up to three child station apparatuses in parallel, the maximum number of child station apparatuses for which a resource unit is to be allocated is three. More specifically, the maximum number of apparatuses for which a resource unit is to be allocated and which is specified in the trigger frame in step S801 is equal to the maximum number of child stations for which the direct connection is maintainable in parallel in. In step S802, the portable terminal 101 transmits data to the MFP 151. The portable terminal 101 transmits the data by using the resource unit allocated with the trigger frame. For example, the portable terminal 101 transmits a print job in step S802. The portable terminal 101 may transmit a request for acquiring the status of the MFP 151 and a request for acquiring the remaining amounts of consumables (ink, toner, and sheet) in step S802.

FIGS. 9A to 9D illustrate examples of an operation screen 900 for setting various modes of infrastructure communication or direct wireless communication. Initially, the user selects a network settings button 901 in FIG. 9A, and the screen in FIG. 9A then changes to the screen in FIG. 9B. FIGS. 9A to D are displayed on the display unit 161.

Figure 9A:
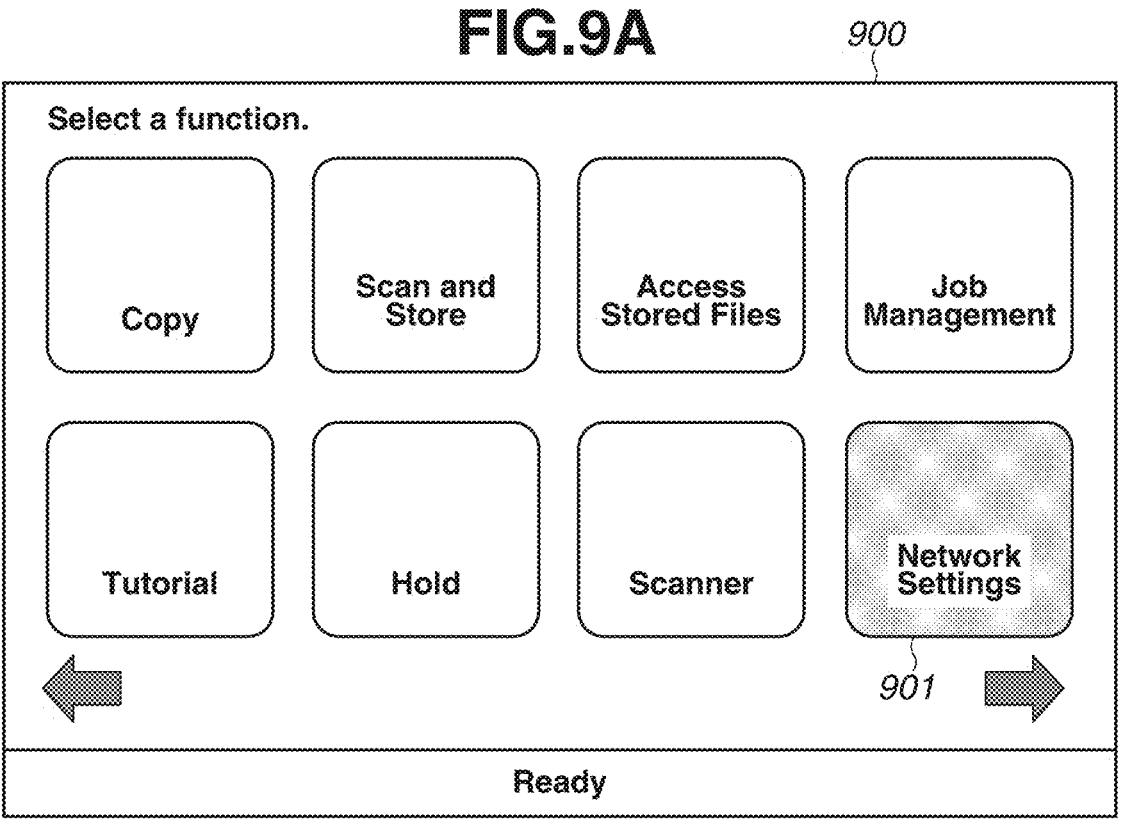
FIGS. 9A to 9D illustrate examples of operation screens.
Figure 9B:
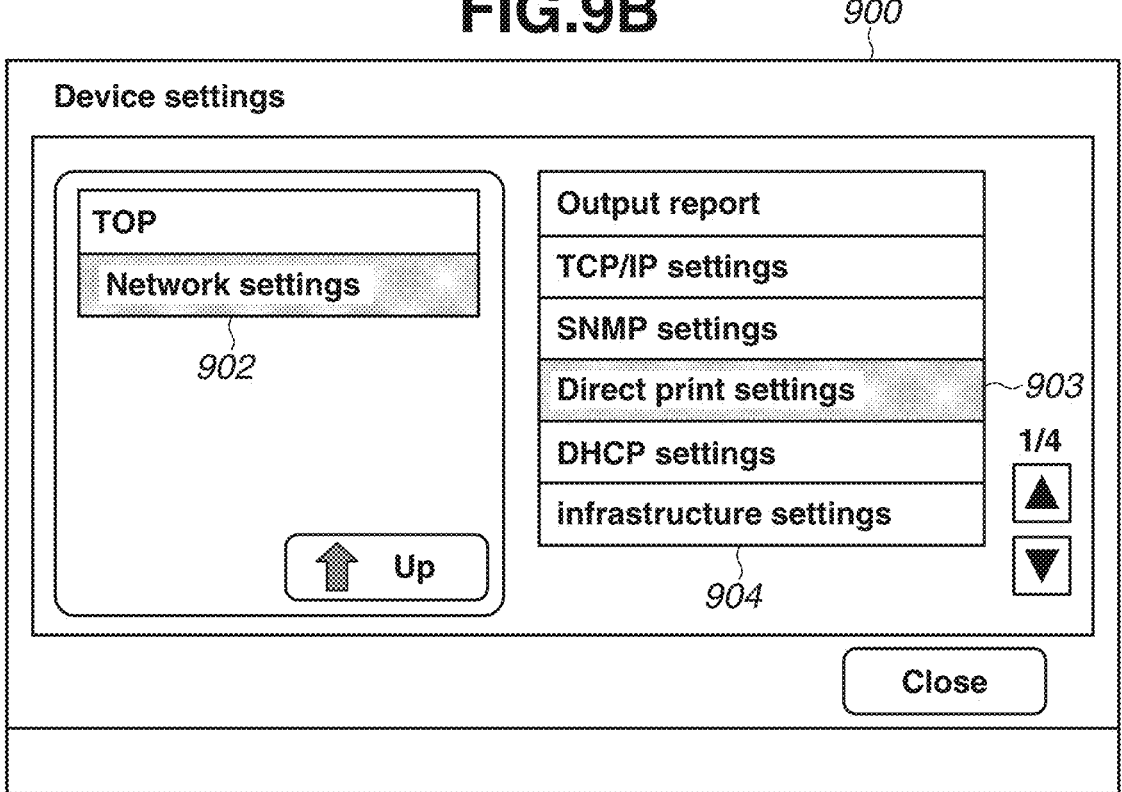

FIG. 9B illustrates a screen for making network settings. When the user selects infrastructure settings 904, the screen in FIG. 9C appears. When the user selects direct print settings 903, the screen in FIG. 9D appears.

Figure 9C:
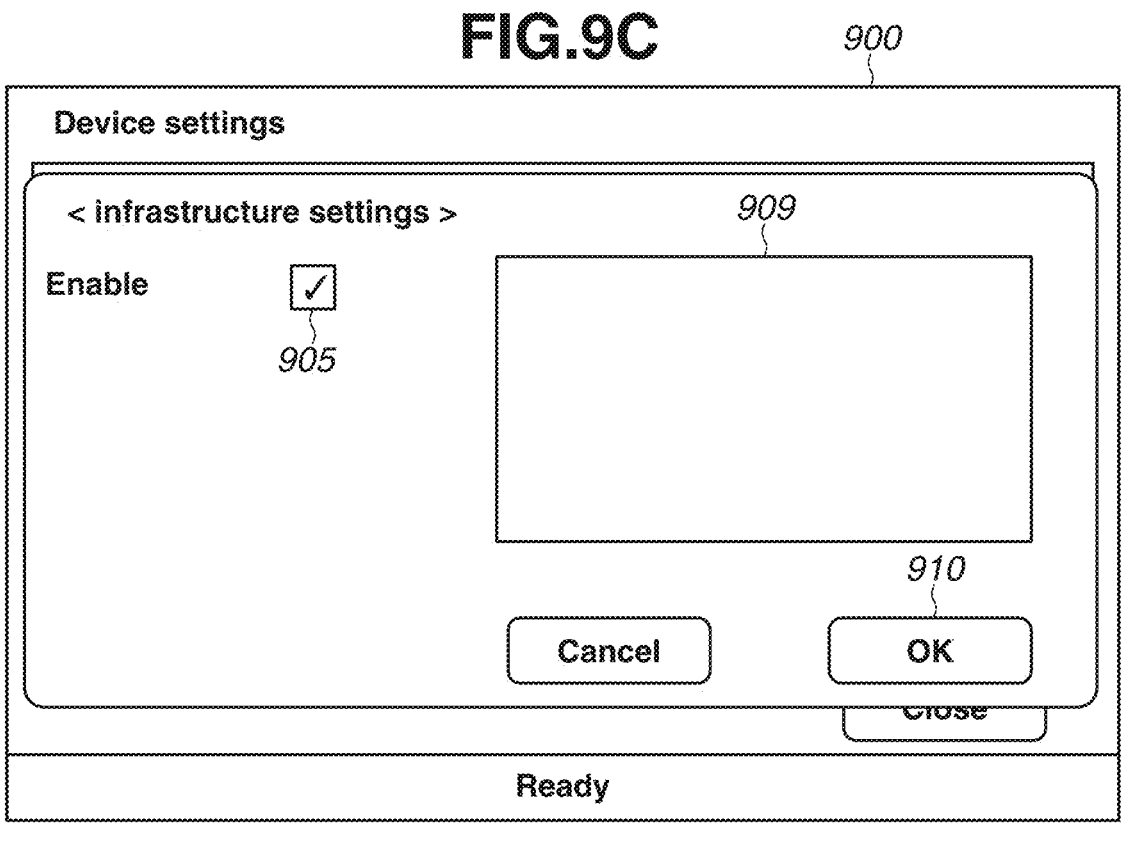

FIG. 9C illustrates a screen for performing setting processing in the infrastructure mode.

When the user checks a check box "Enable" 905, the infrastructure mode is enabled. As a result, the MFP 151 searches for nearby access points and displays a list of SSIDs in an area 909. For example, the SSID of the AP 131 is displayed in the area 909. When the user selects the SSID of the AP 131 from the area 909, an infrastructure mode wireless connection between the MFP 151 and the AP 131 is established. To end infrastructure mode communication, the user unchecks the check box "Enable" 905 to disable infrastructure mode operations of the MFP 151. For example, the infrastructure mode wireless connection between the MFP 151 and the AP 131 is disconnected.

In infrastructure mode communication, the enabled and disabled states of OFDMA mode depends on the settings of the AP 131. More specifically, when OFDMA mode is enabled in the AP 131, the MFP 151 performs infrastructure mode communication in accordance with the setting.

In contrast, with OFDMA mode not enabled in the AP 131, the MFP 151 performs infrastructure mode communication in the OFDM mode in accordance with the setting.

For OFDMA, a complicated method is to be used in primary modulation processing to bring the frequency band to be used for data transmission into a narrow range. Further, a complicated method is also to be used to demodulate OFDMA-based communication data. Therefore, the power consumption of terminal apparatuses is likely to increase.

Figure 8:
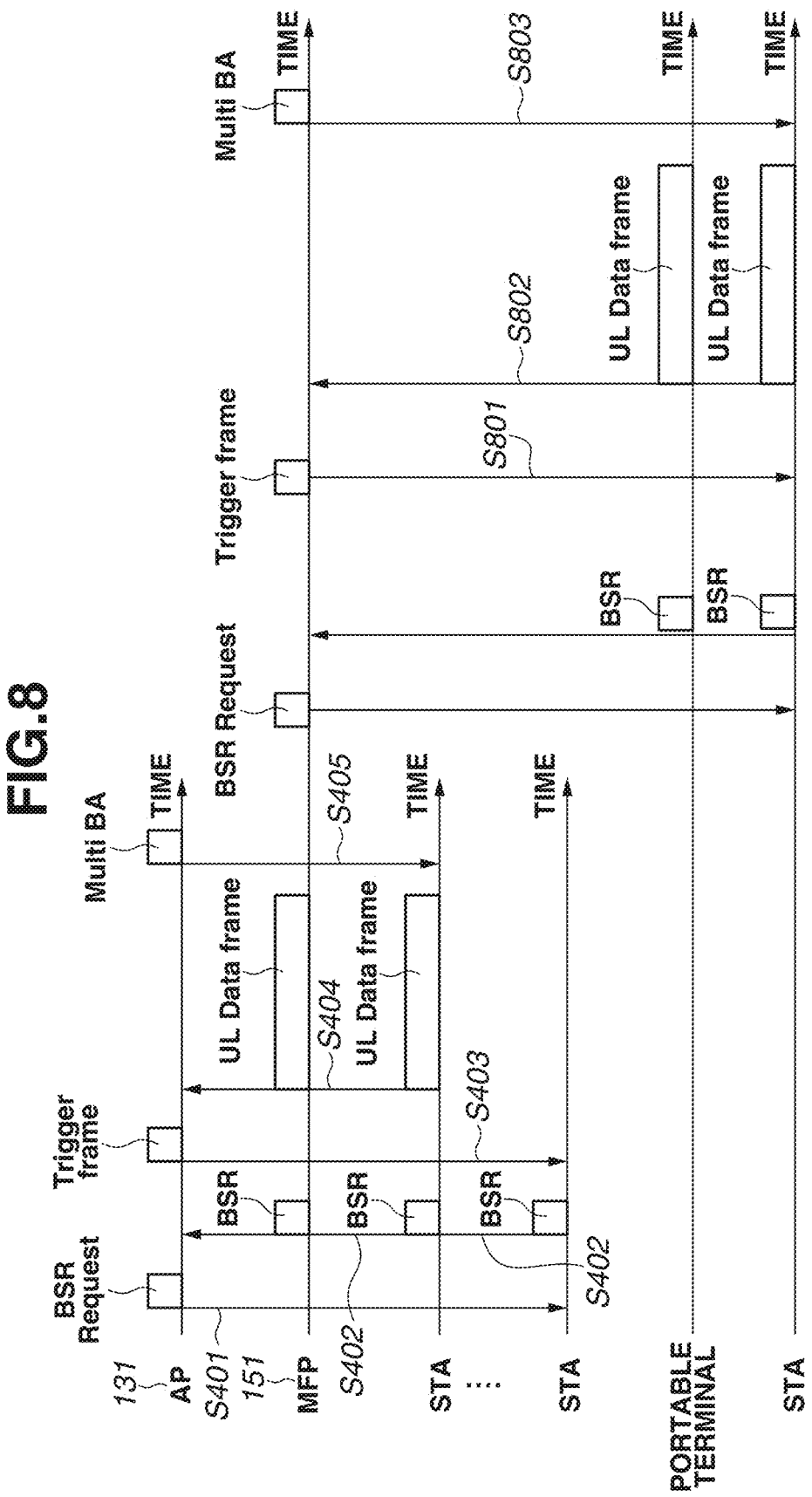
FIG. 8 illustrates an example of communication processing.

In contrast, in OFDM-based wireless communication, communication processing is performed based on a method different from the one described in conjunction with FIG. 8. More specifically, the MFP 151 performs communication processing with all bands of the channel occupied by a specific terminal.

In OFDM, since a specific terminal occupies all bands of the channel, the MFP 151 cannot perform wireless communication with a plurality of STAs at the same time.

However, since the divisional use of the sub channels is not required in OFDM, the MFP 151 can perform the primary modulation processing with a simple method. Therefore, when a terminal that has received a signal in OFDM communication demodulates the signal, a large amount of complicated calculation processing is not required, unlike OFDMA, making it possible to reduce the power consumption of the terminal apparatus.

As described above, each of OFDMA and OFDM has advantages and disadvantages. To make use of the advantages for each communication method, these communication methods are to be determined based on the operating environment.

In a case where a plurality of terminals is to perform simultaneous communication, it is more useful to use OFDMA-based simultaneous communication with a plurality of STAs even if the power consumption increases on the terminal apparatuses.

On the other hand, in a case where not a plurality of terminals is to perform communication, the use of OFDMA-based sub channels is unnecessary, and it is useful to provide a communication environment where the power consumption on terminal apparatuses is reduced by OFDM communication.

Figure 9D:
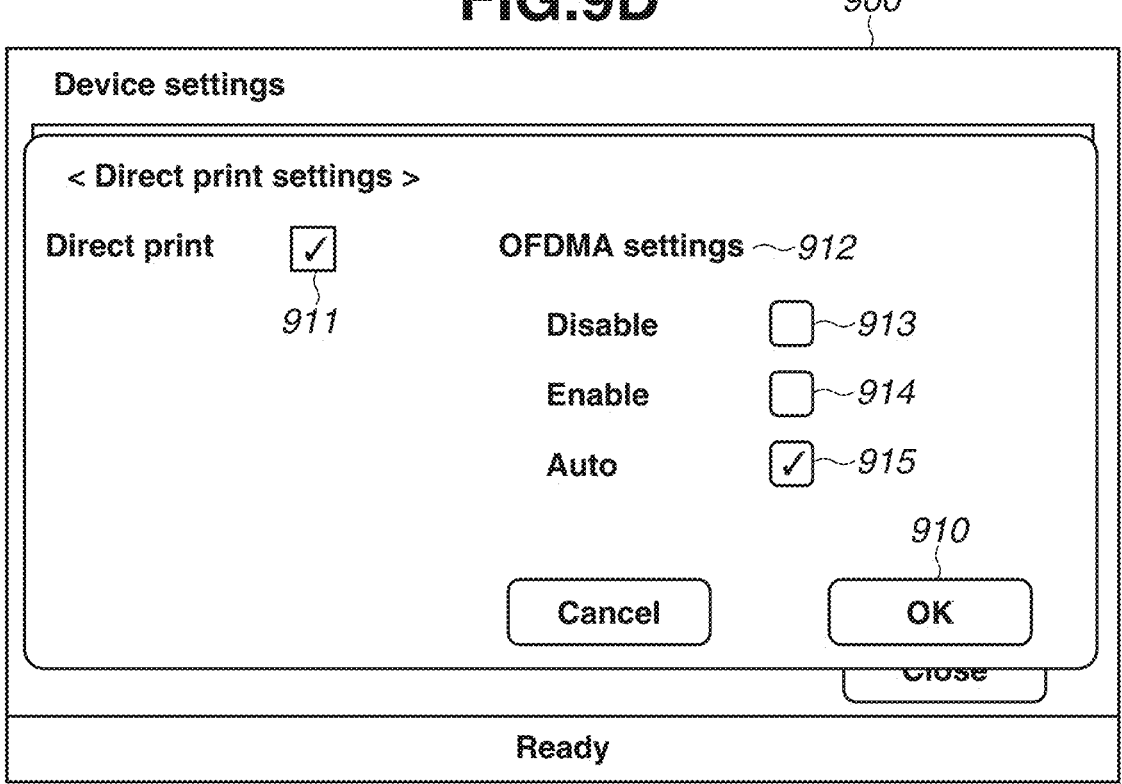

The screen illustrated in FIG. 9D appears when the user selects the "direct print settings" 903 in FIG. 9B.

When the user checks a check box "direct print" 911, the MFP 151 enables the direct mode. Enabling the direct mode causes the MFP 151 to operate as a parent station in P2P communication. More specifically, if the P2P communication is the WFD-based communication, the MFP 151 operates as a group owner (GO). If P2P communication is software-AP-based direct communication, the MFP 151 operates as an AP.

An item "OFDMA settings" 912 is used to determine whether the communication unit 156 enables OFDMA mode in the direct mode. In a case where a check box "disable" 913 is checked, direct communication is performed in a state where OFDMA is disabled. When a check box "enable" 914 is checked, direct communication is performed in a state where OFDMA is enabled.

In a case where a check box "auto" 915 is selected, the MFP 151 checks the enabled or disabled state of OFDMA in the infrastructure mode of the MFP 151, and operates in the same state as that in the infrastructure mode. More specifically, if OFDMA is enabled in the infrastructure mode, the MFP 151 performs direct communication in a status where OFDMA is enabled. On the other hand, if OFDMA is disabled in the infrastructure mode, the MFP 151 performs direct communication in a status where OFDMA is disabled. The check boxes 913 to 915 in FIG. 9D are exclusively selected. In other words, only one of these check boxes is selectable at a time.

Checking OFDMA mode settings in the infrastructure mode enables settings suitable for the environment where the AP 131 and the MFP 151 are installed.

More specifically, the settings of the AP 131 are more likely to be set by a network administrator based on the environment where the AP 131 and MFP 151 are installed. Also, in the direct communication of the MFP 151, the MFP 151 can perform communication suitable for the environment by following the settings.

When an OK button 910 in FIG. 9C is pressed, the MFP 151 ends the settings in the infrastructure mode. When the OK button 910 in FIG. 9D is pressed, the MFP 151 ends the settings in the direct mode.

Figure 10:
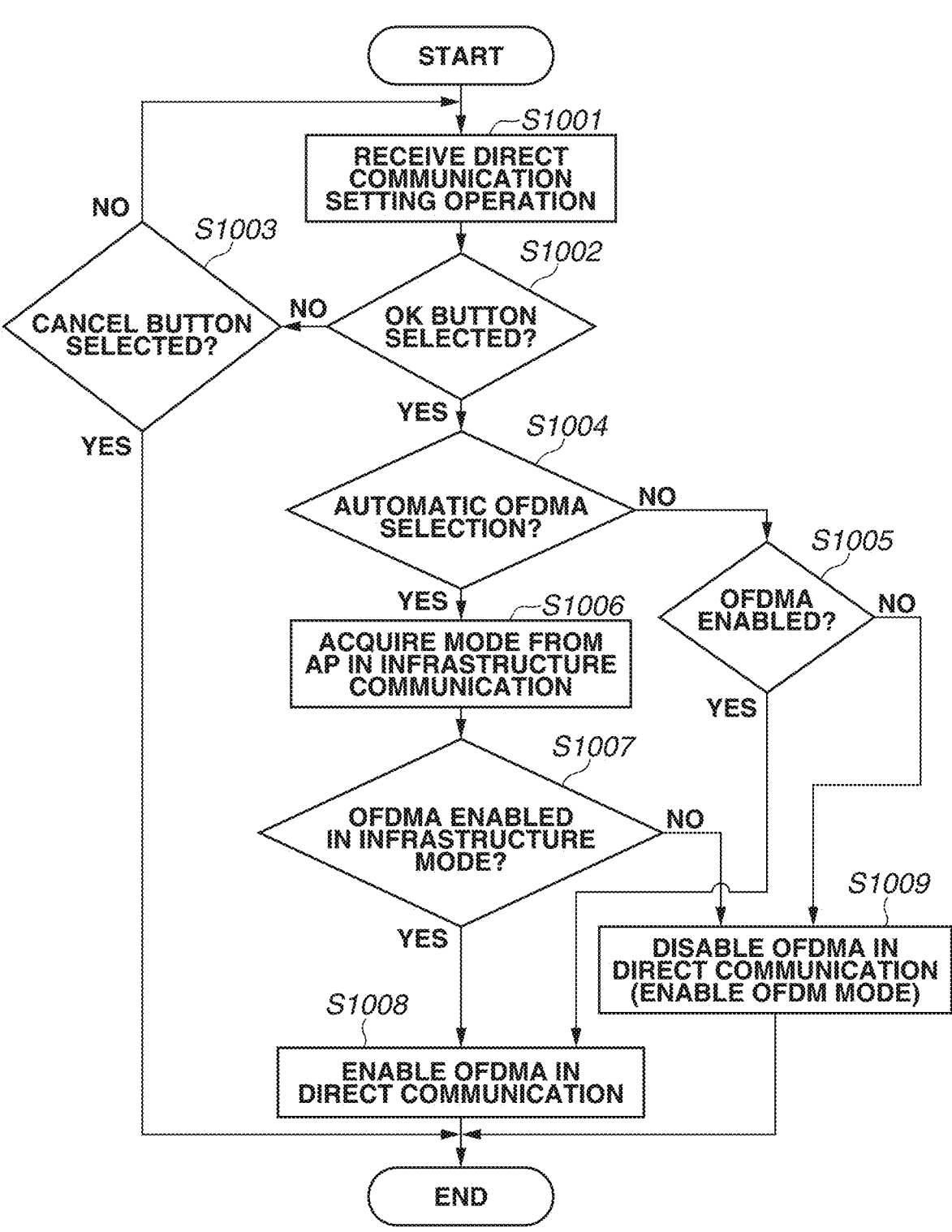
FIG. 10 is a flowchart illustrating processing of the image forming apparatus.

FIG. 10 is a flowchart illustrating operations of the MFP 151 to enable or disable the OFDMA in the direct mode. The flowchart illustrated in FIG. 10 is implemented by the CPU 154 reading and executing each control program stored in the ROM 152.

When a direct print setting operation is started, the CPU 154 receives various setting operations related to direct print settings in step S1001. More specifically, the CPU 154 receives various setting operations performed on the setting screen illustrated in FIG. 9D. In step S1002, the CPU 154 determines whether the OK button 910 is selected. If a result of the determination in step S1002 indicates that the OK button 910 is selected (YES in step S1002), the processing proceeds to step S1004. If a result of the determination in step S1002 indicates that the OK button 910 is not selected (NO in step S1002), the processing proceeds to step S1003. In step S1003, the CPU 154 determines whether the operation performed in step S1001 is the selection of the cancel button. If a result of the determination in step S1003 indicates that the operation performed in step S1001 is not the selection of the cancel button (NO in step S1003), the processing returns to step S1001. The CPU 154 continues the setting operation. If a result of the determination in step S1003 indicates that the operation performed in step S1001 is the selection of the cancel button (YES in step S1003), the CPU 154 ends the setting operation in the flowchart.

In step S1004, the CPU 154 determines whether the check box "auto" 915 is selected. When a result of the determination in step S1004 indicates that the check box "auto" 915 is selected (YES in step S1004), the processing proceeds step S1006. In step S1006, the CPU 154 acquires the status of OFDMA mode in the infrastructure mode.

If the CPU 154 determines that OFDMA is enabled in the infrastructure mode (YES in step S1007), the processing proceeds to step S1008. In step S1008, the CPU 154 also operates the MFP 151 with OFDMA enabled in the direct mode. In a case where the CPU 154 operates the MFP 151 as a parent station in the direct mode, the CPU 154 controls the communication unit 156 so that the MFP 151 operates as a parent station in OFDMA execution state.

If the CPU 154 determines that OFDMA is disabled in the infrastructure mode (NO in step S1007), the processing proceeds to step S1009. In step S1009, the CPU 154 also operates the MFP 151 with OFDMA disabled in the direct mode. In a case where the CPU 154 operates the MFP 151 as a parent station in the direct mode, the CPU 154 controls the communication unit 156 so that the MFP 151 operates as a parent station in the OFDM execution state.

If a result of the determination in S1004 indicates that the check box "auto" 915 is not selected (NO in step S1004), the processing proceeds to step S1005. In step S1005, the CPU 154 determines whether the check box "enable" 914 is selected to be enabled. If the CPU 154 determines that the check box "enable" 914 is checked to be enabled (YES in step S1005), the processing proceeds to step S1008. The CPU 154 then performs the above-described operation in step S1008.

If the CPU 154 determines that the check box "enable" 914 is deselected (NO in step S1005), the processing proceeds to step S1009. The CPU 154 then performs the above-described operation in step S1009.

Through the above-described processing, the MFP 151 can perform the communication processing in the direct mode based on the settings in FIG. 9D.

A second exemplary embodiment will be described below. In the present exemplary embodiment, a description will be provided of processing for enabling or disabling OFDMA in the direct mode at a timing different from the timing according to the first exemplary embodiment.

Figure 11:
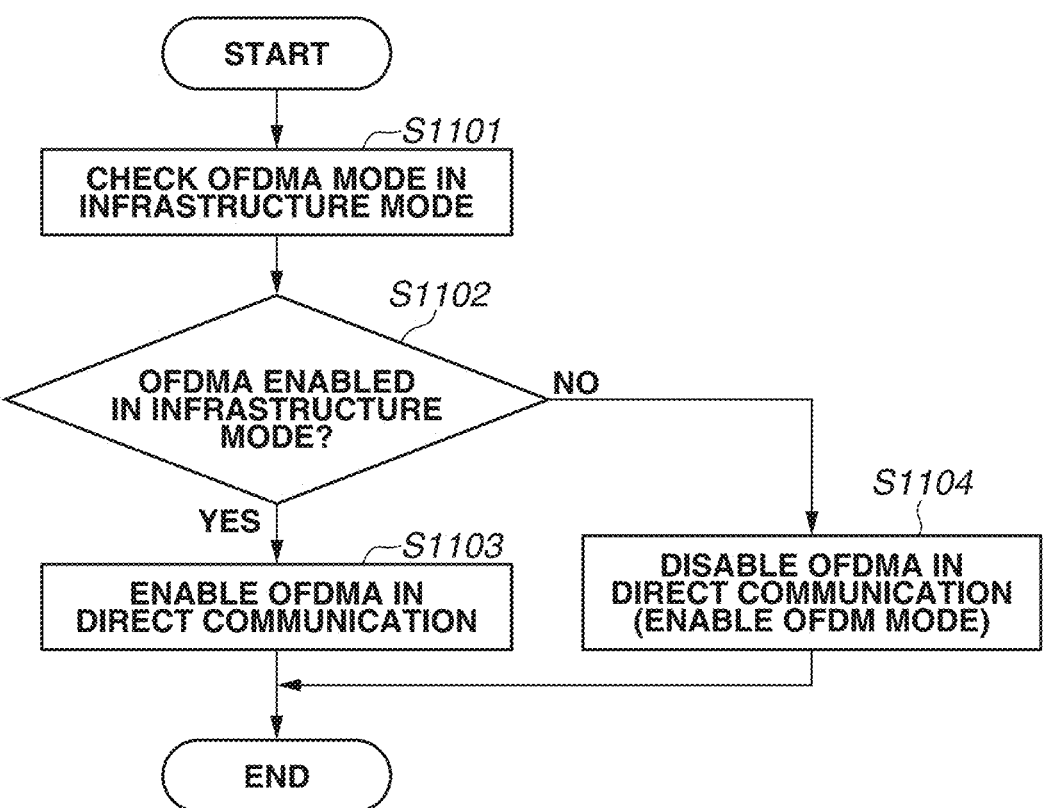
FIG. 11 is a flowchart illustrating processing of the image forming apparatus.

FIG. 11 is a flowchart illustrating processing for enabling or disabling OFDMA in the direct mode according to the present exemplary embodiment. The flowchart illustrated in FIG. 11 is implemented by the CPU 154 reading and executing each control program stored in the ROM 152. The flowchart in FIG. 11 is started when a terminal requests the MFP 151 for the direct connection.

In step S1101, the CPU 154 checks the settings of OFDMA mode in the infrastructure mode. In step S1102, the CPU 154 determines whether OFDMA is enabled or disabled. The CPU 154 refers to the RU allocation sub field 606 in the trigger frame in FIG. 6 transmitted from the AP to implement the operation in step S1102.

If the CPU 154 determines that OFDMA is enabled in the infrastructure mode (YES in step S1102), the processing proceeds to step S1103. In step S1103, the CPU 154 starts direct mode communication with OFDMA enabled.

If the CPU 154 determines that OFDMA is disabled in the infrastructure mode (NO in step S1102), the processing proceeds to step S1104. In step S1104, the CPU 154 starts direct mode communication with OFDMA disabled.

According to the present exemplary embodiment, the status of the infrastructure mode is checked when the MFP 151 is requested for the direct connection, thus enabling the communication that reflects the latest status in the infrastructure mode.

A third exemplary embodiment of the present disclosure will be described below. According to the first and the second exemplary embodiment, when the check box "auto" 915 is selected, the MFP 151 refers to OFDMA settings in the infrastructure mode and determines whether OFDMA in the direct mode is enabled or disabled. However, there may be a form in which the MFP 151 performs only the direct mode with the infrastructure mode disabled.

In the present exemplary embodiment, a description will be provided of a method for automatically determining OFDMA mode in the direct wireless communication without depending on the infrastructure mode.

When the OK button 910 in FIG. 9D is pressed, the MFP 151 performs the carrier sense for each channel for a certain period of time, and estimates the number of terminals based on the number of channels occupied for communication. In a case where the number of occupied channels is determined to be equal to or larger than a threshold value, the MFP 151 determines that the number of terminals that are present near the MFP 151 is equal to or larger than the threshold value. Thus, in this case, the CPU 154 enables OFDMA in the direct mode and starts direct mode communication. On the other hand, in a case where the number of channels occupied for communication is less than the threshold value, the MFP 151 determines that number of terminals that are present near the MFP 151 is less than the threshold value. Thus, in this case, the CPU 154 disables OFDMA in the direct mode and starts direct mode communication.

The MFP 151 may determine whether OFDMA in the direct mode is enabled or disabled with other methods. For example, the MFP 151 may estimate the number of terminals based on the number of probe responses from terminals in response to beacons transmitted in the environment where the MFP 151 is used, and determine whether OFDMA in the direct mode is enabled or disabled based on the result of the estimation.

Even in a case where only the direct mode is enabled and the check box "auto" 915 is selected, the above-described processing enables the MFP 151 to automatically determine whether OFDMA in the direct mode is enabled or disabled.

OTHER EXEMPLARY EMBODIMENTS

While a description has been provided of a case where the MFP 151 enables the direct mode after establishing the wireless connection in the infrastructure mode in the exemplary embodiments, the present invention is not limited thereto. The MFP 151 may enable the direct mode before establishing the wireless connection in the infrastructure mode. In this case, the MFP 151 determines whether OFDMA in the direct mode is enabled or disabled based on the setting of the check box 913 or 914 in FIG. 9D.

While the MFP 151 determines whether OFDMA in the infrastructure mode is enabled or disabled by using a trigger frame transmitted from the AP 131 in the exemplary embodiments, the present invention is not limited thereto.

For example, the MFP 151 may receive information regarding the enabling or disabling of OFDMA of the AP 131 via a wired connection to the AP 131.

OTHER EMBODIMENTS

Various embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like. While exemplary embodiments have been described herein, it is to be understood that the disclosure is not limited to the disclosed exemplary embodiments. The scope of the following claims is to be accorded the broadest interpretation so as to encompass all such modifications and equivalent structures and functions.

While exemplary embodiments have been described herein, it is to be understood that the invention is not limited to the disclosed exemplary embodiments. The scope of the following claims is to be accorded the broadest interpretation so as to encompass all such modifications and equivalent structures and functions.

What is claimed is:

1. A communication apparatus comprising:

at least one memory and at least one processor, which function as:

a first setting unit configured to enable a first mode for performing a wireless communication via an external access point external to the communication apparatus;

a second setting unit configured to enable a second mode for performing a wireless communication without interposing an external access point external to the communication apparatus; and a transmission unit configured to transmit, in a case where the second mode is enabled, a trigger frame including information about orthogonal frequency division multiple access (OFDMA) conforming to IEEE 802.11 standard.

2. The communication apparatus according to claim 1, wherein the at least one memory and the at least one processor further function as a first communication unit configured to perform communication processing in the second mode through OFDMA conforming to the IEEE 802.11 standard based on information about the trigger frame.

3. The communication apparatus according to claim 1, wherein the trigger frame includes information about allocation of a resource unit to be used when a terminal device that is a communication partner in the second mode transmits data to the communication apparatus.

4. The communication apparatus according to claim 3, wherein the resource unit is one of a plurality of resource units into which one communication channel is divided.

5. The communication apparatus according to claim 4, wherein a bandwidth of the one communication channel is any one of 20 MHz bandwidth, 40 MHz bandwidth, 80 MHz bandwidth and 160 MHz bandwidth.

6. The communication apparatus according to claim 1, wherein the wireless communication in the second mode is a Wi-Fi Direct® communication in which the communication apparatus operates as a parent station.

7. The communication apparatus according to claim 1, wherein the communication apparatus functions as an access point in the wireless communication in the second mode.

8. The communication apparatus according to claim 1, wherein the trigger frame includes information indicating whether a carrier sense execution is required in a terminal device that has received the trigger frame.

9. The communication apparatus according to claim 1, further comprising a printer which performs print processing on a sheet based on a print job received through wireless communication in the first mode or wireless communication in the second mode.

10. The communication apparatus according to claim 1, wherein the at least one memory and the at least one processor further function as a third setting unit configured to receive a setting whether to perform OFDMA in the wireless communication in the second mode, via an operation panel of the communication apparatus.

11. The communication apparatus according to claim 1, wherein the at least one memory and the at least one processor further function as:

a reception unit configured to receive a first trigger frame including information about OFDMA conforming to the IEEE 802.11 standard from an external access point external to the communication apparatus while the first mode is enabled; and a second communication unit configured to perform communication processing in the first mode through OFDMA conforming to the IEEE 802.11 standard based on information about the first trigger frame.

12. The communication apparatus according to claim 11, further comprising a printer which performs print processing on a sheet based on a print job received through wireless communication via the first mode or wireless communication via the second mode, wherein the second communication unit transmits information indicating a remaining amount of a consumable item for the communication apparatus or a status of the communication apparatus based on OFDMA conforming to the IEEE 802.11 standard, wherein the remaining amount of the consumable item includes at least one of a remaining amount of ink, a remaining amount of toner, and a remaining amount of sheets, and wherein the information indicating the status of the communication apparatus includes at least one of a paper jam error and a cover being open.

13. The communication apparatus according to claim 11, wherein the at least one memory and the at least one processor further function as a validation unit configured to enable OFDMA in the wireless communication in the second mode based on enabled OFDMA in the wireless communication in the first mode.

14. The communication apparatus according to claim 13, wherein the validation unit enables OFDMA in the wireless communication in the second mode based on information about OFDMA included in the first trigger frame transmitted from the external access point.

15. The communication apparatus according to claim 13, wherein the at least one memory and the at least one processor further function as a determination unit configured to determine whether OFDMA is enabled in the wireless communication in the first mode based on the second mode having been enabled, wherein, in a case where OFDMA is determined to be enabled in the wireless communication in the first mode, the validation unit enables OFDMA in the wireless communication in the second mode.

16. The communication apparatus according to claim 13, wherein the at least one memory and the at least one processor further function as a determination unit configured to determine whether OFDMA is enabled in the wireless communication in the first mode based on reception of a connection request to the communication apparatus in a wireless connection in the second mode, wherein, in a case where OFDMA is determined to be enabled in the wireless communication in the first mode, the validation unit enables OFDMA in the wireless communication in the second mode.

17. A communication method comprising:

enabling a first mode for performing a wireless communication via an external access point external to a communication apparatus;

enabling a second mode for performing a wireless communication without interposing an external access point external to the communication apparatus; and transmitting, in a case where the second mode is enabled, a trigger frame including information about orthogonal frequency division multiple access (OFDMA) conforming to IEEE 802.11 standard.

18. A non-transitory computer-readable storage medium storing instructions of a computer program for executing a communication method, the communication method comprising:

enabling a first mode for performing a wireless communication via an external access point external to a communication apparatus;

enabling a second mode for performing a wireless communication without interposing an external access point external to the communication apparatus; and transmitting, in a case where the second mode is enabled, a trigger frame including information about orthogonal frequency division multiple access (OFDMA) conforming to IEEE 802.11 standard.

* * * * *